Figure 1:
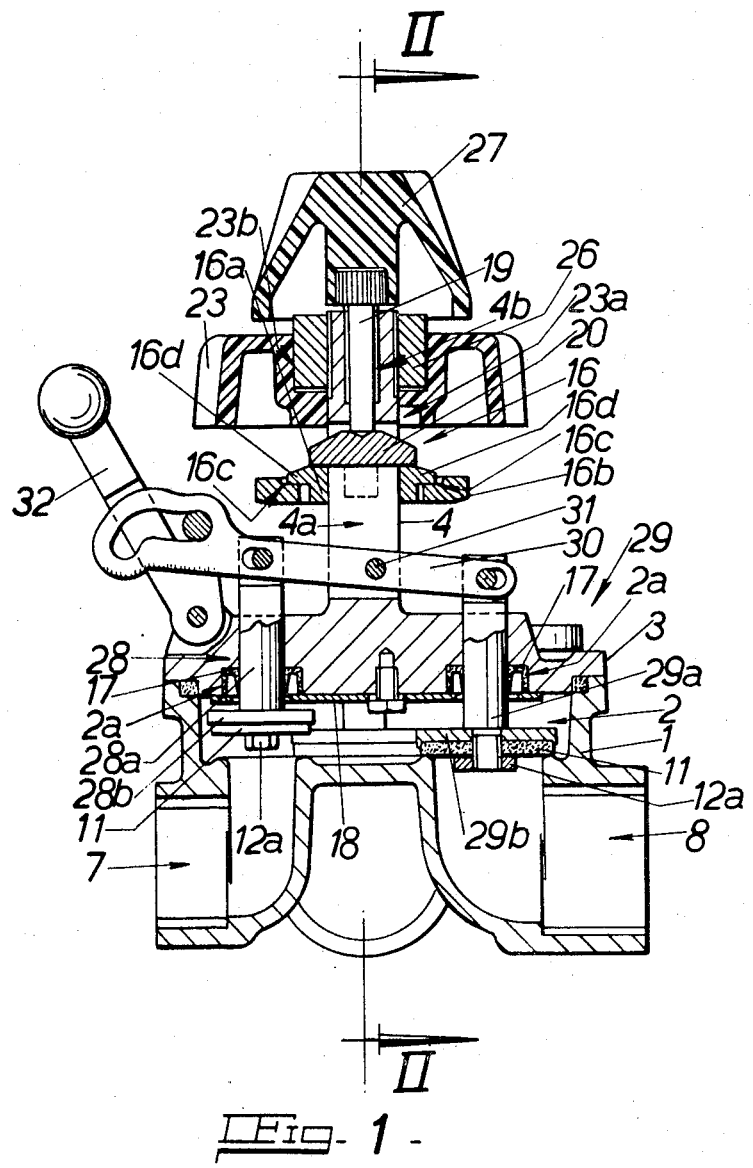

United States Patent [19]
Skitch

[11] 3,710,827
[45] Jan. 16, 1973

[54] FLUID FLOW CONTROL VALVES

[75] Inventor: James F. Skitch, Leckhampton, Cheltenham, Gloucestershire, England

[73] Assignee: Walker Crosweller & Company Limited, Cheltenham, England

[22] Filed: Feb. 26, 1971

[21] Appl. No.: 119,164

[52] U.S. Cl. ............................................. 137/637.4
[51] Int. Cl. ........................................... F16k 31/145
[58] Field of Search ....................... 137/607, 637.4

[56] References Cited

UNITED STATES PATENTS

| 956,860 | 5/1910 | Lawler | 137/607 |
| 3,001,541 | 9/1961 | St. Clair | 137/607 X |
| 3,245,430 | 4/1966 | Enterante | 137/637.4 |
| 3,511,279 | 5/1970 | Hancock | 137/637.4 |

Primary Examiner—Henry T. Klinksiek
Assistant Examiner—David R. Matthews
Attorney—Imirie & Smiley

[57] ABSTRACT

A fluid flow control valve for controlling the flow of two different fluids through separate inlets to one or two outlets, the valve comprising two valve members adjustable along parallel linear paths, and, intermediate the valve members, a hinged control plate and a stop, the valve members are sprung loaded into engagement with the plate which is urged into abutment with the stop, and for controlling the flow and degree of mixing the control plate is rotatable whilst the stop is adjustable along a path parallel to said linear path of the valve members.

10 Claims, 3 Drawing Figures

INVENTOR
JAMES F. SKITCH

INVENTOR
JAMES F. SKITCH

FLUID FLOW CONTROL VALVES

This invention relates to valves for controlling the flow of two different fluids.

In particular this invention is concerned with valves of the kind comprising two valve members which are adapted, respectively, to control the flow of two different fluids through separate inlets to the valve, and which are adjustable to enable the fluid flow through either or each inlet to be varied between zero and a maximum so that, as and when desired, either a mixture, or only a selected one, of the fluids may be discharged through an outlet from the valve and, when a mixture is being discharged, its quality (that is, composition) and/or flow rate may be varied.

Whilst the invention may be applied to valves for controlling the flow of any two different fluids, primarily, it is intended to be applied to valves for controlling the flow of hot and cold water in domestic or analogous water supply installations so that either the hot water, the cold water, or a mixture having any desired temperature between the temperatures of the hot and cold water, may be discharged to an appliance, such as a wash basin, bath or shower, and the rate of flow of the discharged water or mixture may be varied from zero up to a maximum dependent, inter alia, upon the pressures of the hot and cold water supplies.

The principal objects of the present invention are to enable the flow of fluid through the inlets to be so controlled that a linear, or substantially linear, flow rate characteristic is obtained throughout the entire range of quality variations, and a linear, or substantially linear, quality characteristic is obtained throughout the entire range of flow rate variations.

Further objects of the invention are to minimize the force required to adjust the valve members, to enable fine adjustments to be made in the quality and/or flow rate of the discharged fluid, to minimize the number of movable components in, and facilitate servicing of, the valve, and to enable the discharged fluid to be diverted to either of two alternative destinations or appliances.

In accordance with the said invention, a valve of the above-mentioned kind comprises two valve members which are adjustable along parallel, linear paths, and a control plate which is interposed between the valve members and a stop located intermediate the valve members and which is hinged about an axis normal to a plane containing the said linear paths, the valve members being spring loaded and urged into abutment with the plate so that the latter is urged into abutment with the stop, the axis of the hinge being adjustable along a circular path concentric to the stop, and the stop being adjustable along a linear path parallel to the adjustment paths of the valve members.

Preferably, the control plate is circular in plan and is hinged about an axis which coincides with a chord, and is located close to the periphery, of the plate, each of the valve members is provided with an integral stem and is adjustable axially of the stem, free ends of the stems abut the plate in the vicinity of the opposite ends of a common diameter of the latter, and the stop is abutted by the center of the plate.

Figure 2:
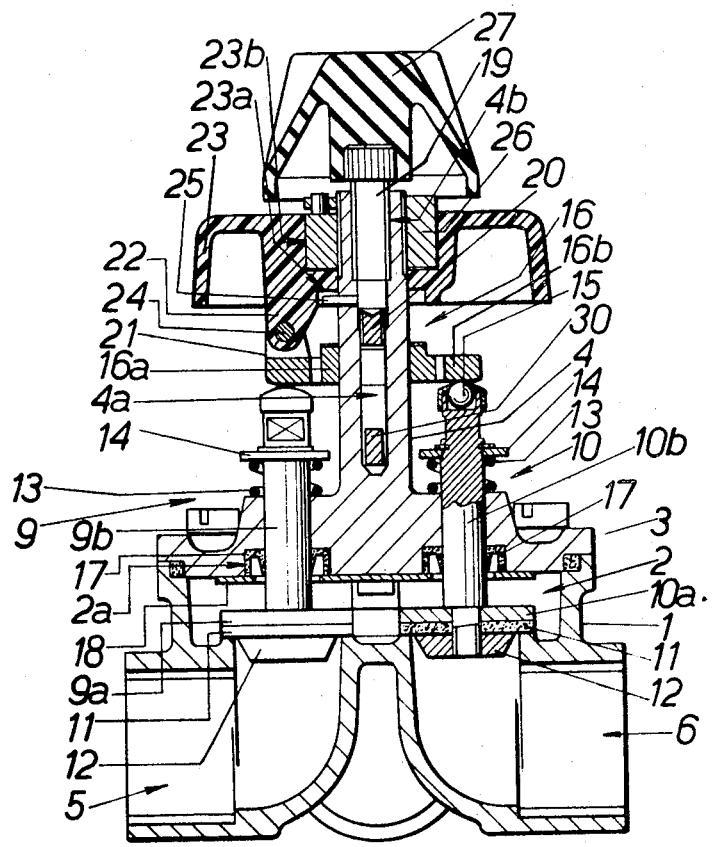
Figure 3:
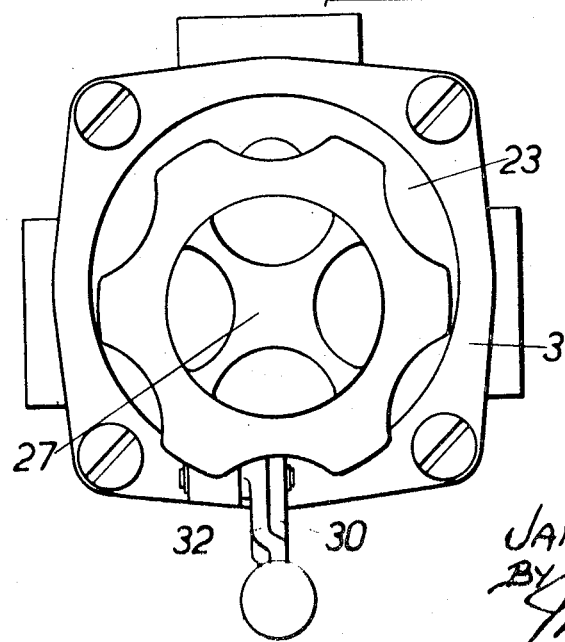

In order that the invention may be understood and carried into practice more readily, one exemplary embodiment thereof will now be described with reference to the accompanying drawings wherein;

FIGS. 1 and 2 are, respectively, sectional elevations of valve, the elevation shown in FIG. 2 being taken along the line II—II, FIG. 1, and FIG. 3 is a plan of the valve.

Primarily, the valve shown in the drawings is intended to be used in a domestic or analogous water supply installation, for controlling the flow of hot and cold water to a bath or shower so that, at the will of an operator, either the hot water, the cold water, or a mixture having any preselected temperature between the temperatures of the hot and cold water, may be fed to the bath or shower at a preselected flow rate.

The valve comprises a base 1 in the top of which a cylindrical well 2 is formed, and a cover 3 which is detachably assembled upon the base so as to span and close the mouth of the well. The cover 3 is provided with a concentric pillar 4 on its upper external surface.

Four passages, namely two inlet passages 5, 6 (see FIG. 2) and two discharge passages 7, 8 (see FIG. 1) of which the inner and outer ends open, respectively, to the floor of the well 2 and the periphery of the base 1, are formed in the base 1. The passages are spaced at 90° apart, and the inlet passages 5, 6 alternate with the discharge passages 7, 8 so that, firstly, the longitudinal center lines of the two inlet passages coincide with a common diameter of the well which is at right angles to another common diameter coinciding with the longitudinal center lines of the two discharge passages and, secondly, the centers of the outlet ends of each two passages are located on opposite sides of and equidistantly from, the pillar 4.

The inner end of each of the four passages is surrounded by an annular and concentric seat which stands proud of the floor of the well and, when the valve is fitted in the supply installation, a hot water supply pipe is connected to the outer end of the supply passage 5, a cold water supply pipe is connected to the outer end of the supply passage 6, whereas delivery pipes to the shower and bath are connected respectively to the outer ends of the discharge passages 7 and 8.

The inner end of each inlet passage is adapted to be opened and closed by a corresponding one of the two adjustable valve members 9, 10 each of which comprises a disc shaped head 9a and 10a respectively, and a cylindrical stem 9b and 10b respectively which projects from the center of and perpendicularly to the upper face of the head. A sealing washer 11 is retained upon and concentrically to the lower face of the head of each of the members 9, 10, by a frusto-conical or domed nut 12 and each of the stems extends through, is reciprocable in and is perpendicular to the cover 3, at a position such that its washered head is disposed within the well 2 in concentric relationship to the inner end of the corresponding inlet passage. The stems 9a, 10a reach beyond the upper surface of the cover 3 where each is encircled by a coil spring 13 which is partially compressed between the cover 3 and a collar 14 carried around the corresponding stem close to the upper free end of the latter. Hence, each of the valve members 9, 10 is urged by its spring 13 in the direction which removes its washered head away from the seat around the inner end of the corresponding inlet passage to enable water to flow through the seat into the well 2. A ball 15 is so accommodated and retained within the upper end of each stem that it is rotatable relatively to and protrudes beyond the said end and is urged constantly into abutment with the underside of a control plate 16 by the corresponding spring.

To prevent the water from seeping past the stems 9b, 10b from the well 2, each stem is encircled by a resilient, U-section ring 17 which is so accommodated within a pocket in the lower surface of the cover 3, that the annular mouth of the ring 17 opens to the well 2, the inner and outer peripheral walls of the ring 17 are in respective contact with the stem and the periphery of the pocket. Hence, when water flows into the well from either inlet passage, the pressure of the water forces the peripheral ring walls against the stem and pocket peripheries, thereby providing effective seals. The rings 17 are held in their respective pockets by an apertured retaining plate 18 detachably secured to the lower surface of the cover.

The control plate 16 comprises an inner annulus 16a which surrounds and is slidable lengthwise of the pillar 4, and an outer annulus 16b which encircles, and of which the internal diameter exceeds the external diameter of, the inner annulus 16a.

Each of a diametrically opposed pair of radial recesses 16c formed in the upper surface of the outer annulus, is engaged (see FIG. 1) by a corresponding one of a diametrically opposed pair of ears 16d projecting radially from the external periphery of the inner annulus. The balls 15 in the upper ends of the spring-loaded stems of the two valve members 9, 10 are urged into abutment with the underside of the outer annulus 16b at diametrically opposed positions of the latter, with the result that the floors of the recesses are urged into abutment with the lower edges of the two ears and these edges are curved convexly and transversely so that, due to the difference between the internal and external diameters of the outer and inner annuli, the outer annulus is able to rock upon the ears relatively to the inner annulus.

The pillar 4 is formed, first, with a diametrical slot 4a which (see FIG. 2) extends upwardly of, and part way along the pillar from the cover and, secondly, with a coaxial, tapped bore 4b which extends from the upper end of the slot to the upper end of the pillar 4 and is engaged by a threaded spindle 19 having an axial dimension greater than the length of the bore so that the lower end of the spindle extends into the slot and its upper end projects beyond the upper end of the pillar.

The lower end of the spindle 19 tapers to a point and engages an inverted, conical depression in the center of the upper edge of an abutment bar 20 extending through the slot 4a and having a flat lower edge against which the upper surface of the inner control plate annulus 16a is urged by the spring-initiated forces applied to the outer annulus 16b by the stems of the valve members and transmitted to the inner annulus 16a through the diametrically-opposed ears 16d.

A bifurcated lug 21 projecting upwardly from the upper surface of the outer annulus 16b mid-way between the pair of radial recesses, embraces a tongue 22 integral with and depending from a knob, lever or analogous operating member 23 (hereinafter called the temperature control knob) mounted around and rotatable about the pillar 4 above the control plate 16. The lug 21 is hinged upon the tongue 22 by a pin 24 which extends through registering holes in the lug 21 and tongue 22 and of which the longitudinal center line coincides with a chord of the control plate 16.

A shallow arcuate pocket 23a which is concentric to the pillar 4 and spans an arc of approximately 180°, is formed in the lower side, and a deeper pocket 23b, which is also concentric to the pillar 4 and is of circular shape in cross-section, is formed in the upper side of the said temperature control knob 23. The arcuate pocket is engaged by a stud 25 fixed in and projecting radially from the pillar so as to limit the angular travel of the knob 23 and control plate 16 about the pillar, to 180°. The deeper pocket is engaged by a nut 26 which is screwed on to, and is locked against rotation upon, the upper end of the pillar 4 to prevent movement of the temperature control knob 23 lengthwise of the pillar 4.

A second knob, lever or analogous operating member 27, (hereinafter called the flow-rate control knob) is secured upon the upper end of the spindle 19 so that, by rotating the flow-rate control knob 27, the spindle 19 may be rotated within and, therefore, adjusted axially relatively to the pillar 4 so as to enable the control plate 16 to be turned about the axis of the hinge pin 24 either upwardly by either one or both of the spring-loaded valve members 9, 10 as the spindle 19 is adjusted upwardly, or downwardly by the spindle 19 as the latter is adjusted downwardly, within the pillar 4.

The arrangement is such that, when by adjusting the spindle 19 downwardly within the pillar 4, the control plate 16 may be swung about the axis of the said hinge pin 24 towards the cover 3 until, when the plate 16 is parallel to the cover 3, both valve members 9, 10 are located in the positions in which their washered heads 9a, 10a are forced upon the seats around, and therefore close and seal, the inner ends of the respective inlet passages 5, 6. Further, the arrangement is such that by aligning the lug 21 of the control plate 16 with the stem of either one of the valve members then, irrespectively of the adjusted position of the spindle 19, again the said one valve member may be located in its passage closing and sealing position. However, when both of the valve members are in their passage closing positions and the lug 21 is aligned with the stem of one of the members, subsequent adjustment of the spindle 19 upwardly of the pillar, enables the control plate to be swung upwardly about the axis of the pin 24 by the stem of the other spring-loaded valve member and, as a consequence, this valve member is spring driven away from the seat around the inner end of the corresponding inlet passage 5 or 6 until, when the frusto-conical or domed nut 12 on the head of the valve member is removed completely from within the seat, the inner passage end is opened fully. Then, by rotating the control plate about the pointed spindle end, the lug 21 is adjusted along an arcuate path concentric to the pillar 4 and is moved out of alignment with the stem of the one valve member and this valve member is spring driven from its passage closing position whilst the other valve member is driven, against spring action, by the control plate 16 towards its passage closing position; by rotating the control plate 16 to the position wherein the lug is aligned with the stem of the other valve member, the positions of the two valve members are reversed.

From the above description, it will be appreciated that, firstly, when (as shown in FIG. 2) the control plate 16 is parallel to the cover 3 and the inner ends of both inlet passages 5, 6 are closed, neither hot water nor cold water may flow into the well; secondly and provided the lug 21 is in alignment with, for example, the stem 9b of the valve member 9 controlling the inner end of the hot water inlet passage 5, as the spindle 19 is adjusted upwardly of the pillar 4 by rotating the flow-rate control knob 27 manually, the valve member 10 controlling the inner end of the cold water inlet passage 6 is spring driven in the direction which gradually opens the said inner end so that cold water flows into the well at a rate which, due to the emergence of the frusto-conical or domed nut 12 on the head of the member 10 from within the corresponding seat, increases in proportion to the distance travelled by the valve member 10 until, when the nut is removed completely from within the seat, a maximum rate of flow is attained; thirdly, if, by rotating the temperature control knob 23 manually, the control plate is then rotated, the valve member 9 controlling the inner end of the hot water inlet passage 5 is spring driven in the direction which gradually opens the said inner end so that hot water flows into the well at a gradually increasing rate and is mixed with the cold water, whereas the valve member 10 controlling the inner end of the cold water passage is driven, simultaneously and against spring action, in the reverse direction so that the rate at which the cold water flows into the wall, is gradually reduced thereby increasing the temperature of the mixture until, when the control plate has been rotated through 180°, the inner end of the cold water inlet passage is closed and the hot water flows into the well at a maximum rate; fourthly, if, at any setting of the control plate along the said 180° of travel, the spindle 19 is adjusted inwardly of the pillar 4, thereby swinging the control plate 16 downwardly towards the cover 3, either the rates of flow of the hot and cold water into the well 2 are reduced without changing the mixture temperature or, if the lug 21 is aligned with the stem of one of the two valve members 9, 10 at the time the spindle 19 is adjusted, the rate of flow of the hot or cold water, as the case may be, into the well 2 is reduced.

To enable the water (whether hot, cold or a mixture of hot and cold) fed into the well 2, to be discharged from the valve to either of two different destinations, such as a bath and a shower, two additional valve members 28, 29 (see FIG. 1) are carried by and are reciprocable in the cover 3. These additional valve members are of the same construction and are sealed by rings 17, in the same manner, as the valve members 9, 10 except that they are not spring-loaded, their respective stems 28a, 29a are shorter than the stems 9a, 10a, and are slotted diametrically at their upper free ends, and the sealing washers 11 are retained upon the respective heads of the said additional members by ordinary nuts 12a instead of by frusto-conical or domed nuts. Each of the additional valve members 28, 29 is concentric to and is adapted to control the flow of water from the well 2 to the inner end of a corresponding one of the discharge passages 7, 8 in the base 1, and the slotted ends of the stems embrace and are coupled, by pin-and-slot connections, to a lever 30 which extends through the pillar slot 4a below the control plate 16 and is pivoted upon the pillar about the axis of a pin 31 carried by the pillar and extending across the slot parallel to the cover. The lever projects beyond the stem 28a where it is coupled (for example and as shown in FIG. 1) to a manually operable handle 32 which is pivoted upon and extends upwardly from the cover 3, and is adapted to turn the lever about the axis of the pivot pin 31 between two extreme positions. In one of these extreme positions (also shown in FIG. 1) the washered head of the valve member 29 abuts the seating around, and closes, the inner end of the discharge passage 8 but the washered head of the valve member 28 is spaced upwardly from the seating around the inner end of the discharge passage 7 so that water is able to flow freely through the latter passage from the well to, for example, the shower. When, by actuating the handle 32, the lever is turned anticlockwise to its alternative extreme position, the washered head of the valve member 29 is raised clear of the seating around the inner end of the discharge passage 8, thereby enabling water to flow freely through this passage from the well to the bath, and the washered head of the valve member 28 is lowered into abutment with the seating around the inner end of the discharge passage 7, thereby terminating the flow of water to the shower.

Should any fault arise in the flow control mechanism carried by the cover 3, the latter may be dismantled from the base 1 and replaced by another cover and mechanism so that the valve is out of operation for a minimum of time and the original cover and mechanism may be serviced at leisure.

The temperature and flow-rate control knobs 23, 27 are so assembled to the upper ends of the pillar and spindle respectively, that they may be removed as and when desired. When the said knobs are removed, a domed or like cover (not shown) may be assembled upon the cover 3 so that the control plate and upper portions of the valve member stems are enclosed and the valve is suitable for mounting either upon the surface of, for example, a wall or with the passaged base 1 embedded in the wall; alternatively, a mounting plate may be assembled around and secured to the pillar above the control plate so that, again for example, the valve may be mounted in a panel with the base, valve members and control plate located on one side, and the mounting plate and the control knobs 23, 27 located on the opposite side, of the panel with the handle 32, or any analogous means for turning the lever 30 between its two extreme positions, extending through the panel.

I claim:

1. A fluid flow control valve for controlling the flow of two different fluids through two separate inlets to an outlet, said valve comprising two valve members each adjustable along parallel linear paths for controlling the flow of one of said fluids, a control plate for operating said valve members and interposed therebetween, said control plate being hinged about an axis normal to a plane containing said linear paths, spring means urging said valve members into abutment with said control plate abutment means mounted for adjustment along a linear path parallel to said first mentioned linear paths, said control plate being urged by said spring means into engagement with said abutment means and being rotable about an axis parallel to said linear paths to adjust the position of said hinge axis relative to said valve members.

2. A fluid flow control valve as claimed in claim 1 wherein said control plate is of annular form and said hinge axis coincides with a chord adjacent to the periphery of said control plate, said valve members abut said control plate in the vicinity of the opposite ends of a common diameter of said control plate, and said abutment means is adjustable along a linear path coincident with said axis of rotation of said control plate.

3. A fluid flow control valve as claimed in claim 2 wherein each of said valve members comprises an integral stem and is reciprocable axially of said stem and said spring means loads said stem to urge one end of said stem into abutment with said control plate, and said spring loading urges said control plate into engagement with said abutment means.

4. A fluid flow control valve as claimed in claim 3 wherein said valve members are carried for said axial in a cover assembled to and spanning the mouth of a well in a base formed with said two separate inlets of which the inner ends open to the floor of said well in respective concentric relationship to said linear adjustment paths of said valve members, and each of said valve members comprises a washered head which is accommodated within said well and is adapted to close and seal a corresponding one of said two inlet passages.

5. A fluid flow control valve as claimed in claim 4 wherein said stems of said valve members extend through and are reciprocable in said cover and, on the opposite side of said cover to said well, each said stem is encircled by a coil spring which is partially compressed between said cover and a collar encircling said stem between said spring and said control plate.

6. A fluid flow control valve as claimed in claim 5 wherein a pillar projects from the external surface of said cover and has a longitudinal slot, said control plate encircles and is rotatable about said pillar, said abutment means comprises a bar extending through said longitudinal slot in said pillar, and said bar is adjustable on rotation of a threaded spindle which is screwed into a tapped, concentric bore extending through said pillar on the side of said control plate opposite to said cover.

7. A fluid flow control valve as claimed in claim 6 wherein a manually operable, temperature control knob encircles and is rotatable about said pillar on the opposite side of said control plate to the cover, and a lug projecting from said control plate is hinged upon a tongue depending from said control knob.

8. A fluid flow control valve as claimed in claim 7 wherein a manually operable, flow rate control knob is secured to said spindle on the side of the temperature control knob opposite to said control plate.

9. A fluid flow control valve as claimed in claim 1 wherein said valve includes a base formed with two outlets and said two inlets, said inlets alternating with the said outlets circumferentially of said base, said outlets opening to a well, and the valve includes two additional valve members each of which is adapted to close a corresponding one of said outlets.

10. A fluid flow control valve as claimed in claim 9 wherein said two additional valve members are operable by a lever mounted for pivotal movement between two extreme positions in each of which a corresponding one of the said additional valve members is located in its closing position.

* * * * *